United States Patent Office 2,935,921
Patented May 10, 1960

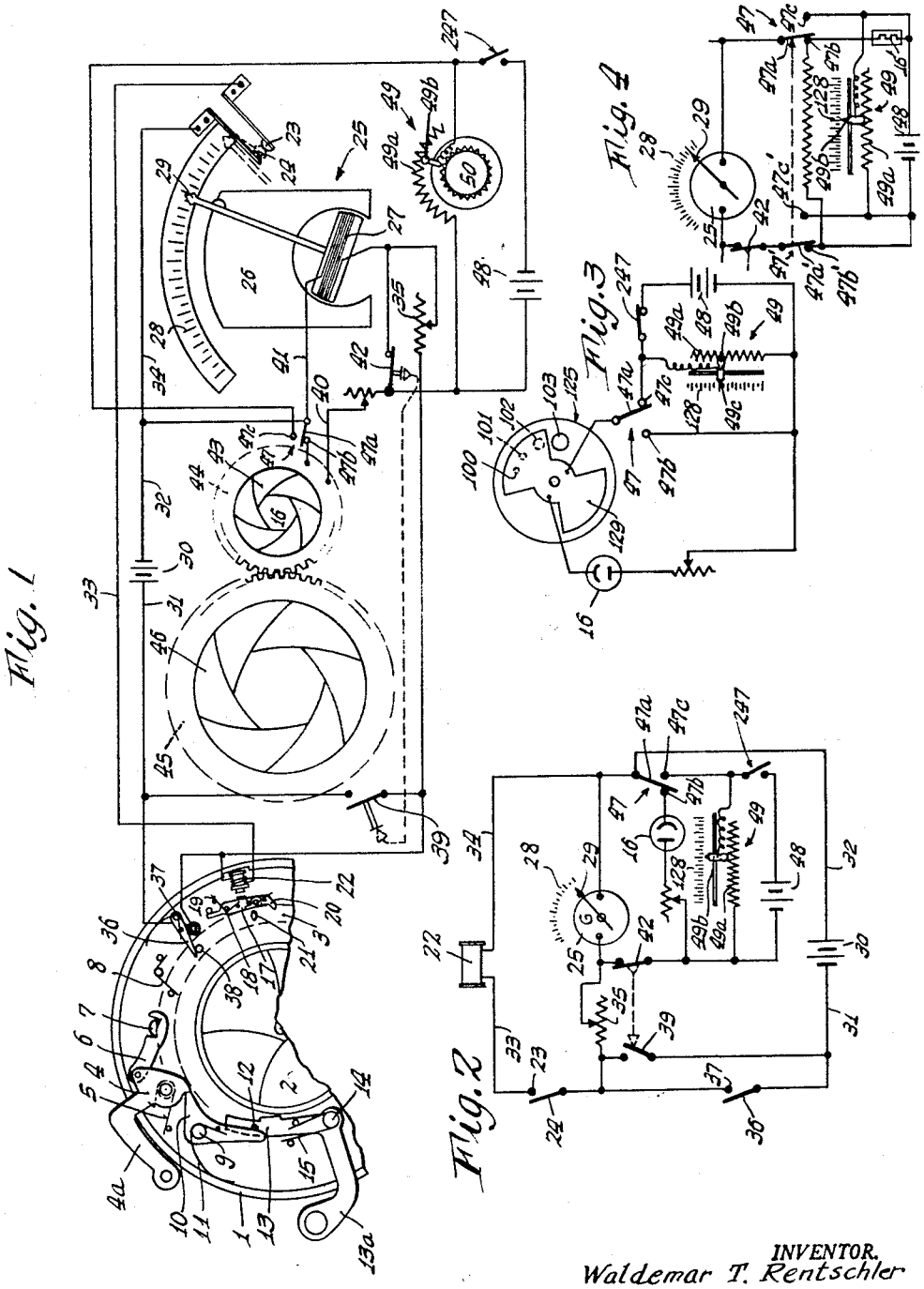

2,935,921

PICTURE-TAKING APPARATUS WITH AUTOMATIC AND MANUAL EXPOSURE REGULATION

Waldemar T. Rentschler, Calmbach (Enz), Germany, assignor to Alfred Gauthier, G.m.b.H., Calmbach (Enz), Germany, a corporation of Germany Application February 20, 1959, Serial No. 794,578

Claims priority, application Germany February 22, 1958

3 Claims. (Cl. 95—10)

This invention relates to picture-taking equipment such as cameras and the like, wherein automatic speed regulation is effected in accordance with the strength of the field of illumination and the energization of photoelectric elements which translate the light conditions into electrical energy.

Picture-taking equipment and especially photographic cameras of this type are well known, and in the past there have been various proposals and structures provided for effecting an automatically regulated shutter speed. All of the automatic mechanisms in prior devices of this type are operative in response to the illumination of the photoelectric element which determines the exact exposure needed for an existing light condition, such mechanisms being thus distinguished from those utilized for the taking of pictures by means of flash exposures. In connection with these latter exposures there has been provided for the purpose of controlling and regulating the shutter speed well-known escapement mechanisms which are to be used alternatively and not in conjunction with the automatic photoelectric controlled regulating mechanisms, said escapement mechanisms being set for different speed values by means of a suitable setting member.

With this prior equipment for taking pictures it was possible to effect a speed regulation for both a constant field illumination and also an illumination by means of flash exposures, but in order to accomplish this there was necessitated a rather costly dual construction, which was not only complicated but required additional parts and an appreciable amount of space. The fabrication of such a dual-function control was expensive, as well as the making and assembling of the necessary parts which were involved.

An object of the present invention is to provide a novel and improved picture-taking apparatus having an automatic speed regulation, wherein the regulating or control mechanism is relatively simple and uncomplicated as well as inexpensive to produce, said mechanism being operable not only to effect an automatic control by means of a photoelectric element responding to the field of illumination but also to enable manually settable speeds to be effected as well.

The above object is accomplished, in accordance with the invention, by arranging the speed regulating mechanism so that it may be disconnected from the photoelectric element, and by providing a manually operable switching device and a source of electrical energy which is independent of the field of illumination, said energy source by means of the switching device being connectible to the regulating mechanism in place of the photo element for the purpose of enabling manually settable speeds to be obtained.

There is thus provided by the invention an improved picture-taking apparatus characterized by a simple, inexpensive and space-saving construction, which provides the surprising and important advantage that the same speed regulating mechanism may be used both for automatic regulation in conjunction with the photoelectric element and also for manual regulation apart from the functioning of the said element. In order to accomplish this, it is only neccessary to add to the automatic speed regulating mechanism a source of electrical energy which is independent of the condition of illumination, together with a selector switch by means of which the speed regulating mechanism may be disconnected from the photoelectric element and instead connected to the said independent source of electrical energy. Such an organization requires no special conditions or construction of the picture-taking apparatus, and thus can be used in the same simple and advantageous manner with all such types of apparatus. Also, the invention may be readily incorporated in existing picture-taking equipment or cameras of the above kind having automatic speed regulating mechanism responsive to light conditions.

When the apparatus is so arranged that a manual control of the speed is had by the employment of the independent source of energy, the adjustment or setting of the device may be effected by the use of a simple, manually operable regulator such as a variable resistor incorporated in the circuit of the energy source. By means of such regulator the magnitude of the current or voltage of the energy source may be changed, thereby to condition the speed regulating mechanism so as to effect the different exposure values. The setting of the regulator or resistor thus enables a pre-selection of the speed to be readily had. To obtain indications as to the various settings of the regulator or resistor, its actuating handle may be referred to a suitable speed scale. In picture-taking apparatus where there is provided an additional source of voltage or current to effect actuation of the photoelectric element, the invention may be advantageously employed in an economical manner by arranging the selector switch and the circuits controlled thereby so as to utilize the said additional voltage or current source to effect not only the supply for the photocell but alternatively the supply for the manual control by suitably switching said source to the speed regulating mechanism.

In the accompanying drawings there are shown two embodiments of the invention.

Figure 1 is a diagrammatic representation of the present improved control device, shown in conjunction with a photographic lens shutter.

Fig. 2 is a schematic diagram of the control device illustrating further the principle of operation of the same.

Fig. 3 is a schematic circuit diagram of a control device constituting a modification of the invention.

Fig. 4 is a schematic circuit diagram of a control device similar to that of Figs. 1 and 2, but using a different kind of photo receiver.

Referring first to Fig. 1, the housing or casing of the lens shutter is indicated by the numeral 1. In the housing 1 shutter blades 2 are arranged, said blades being actuated in the well known manner by a driving ring 3 which is drawn in dotted outline. The blade ring 3 is driven in turn by a connecting latch or link 6 pivotally joined to a cocking and driving disk 4 having the usual manually operable handle 4a. The driving disk 4 is biased in a clockwise direction by a driving spring 5, and the connection between the link 6 and the ring 3 includes a semicircular pin 7 carried by the ring 3 and engaged in a notch or mouth provided in the link 6. A spring 8 engages the shutter blade ring 3 and biases the same counterclockwise, thereby to normally hold the shutter blades 2 in their closed positions as shown. As is well understood in the art, release of the disk 4 for clockwise turning effects first a clockwise turning of the blade ring 3 and thereafter a counterclockwise turning of the ring, to first open the shutter blades 2 and then close them.

The driving disk 4 is held in its cocked position as shown, by a two-armed lever 10 pivotally mounted on a spindle 9 carried in the casing 1. When the shutter is cocked, one arm of the lever 10 cooperates with a nose-like projection on the driving disk 4, as shown. The other arm of the lever 10 is engaged by a pin 12 carried by a shutter release lever 13, the said lever 10 being biased counterclockwise by a spring 11 to maintain such engagement. The shutter release lever 13 is pivotally mounted on a spindle 14 and is biased clockwise by a spring 15. The release lever 13 has the usual actuating handle 13a, protruding from the exterior of the casing 1 through a suitable slot therein.

The automatic regulation of speed as determined by the illumination of the photoelectric element is effected, in the organization shown, by holding the shutter blades 2 in their open positions for a length of time determined by the movement of a movable or deflection part of an electromagnetic device or system. Such deflection part has different starting positions which are determined by the intensity of light acting on the photoelement 16, said starting positions being therefore an indicator of the light conditions. The deflection part in moving from a particular starting position to its position of maximum deflection requires a certain amount of time, which time is utilized as a factor in maintaining the shutter blades in their open positions. The movement of the deflection part is started upon release of the shutter blades, either directly or indirectly in response to actuation of the shutter release, the deflection part being previously held in a given starting position by the photoelectric element and light conditions activating the element. The movement or deflection of the part is caused by energizing the electromagnetic device or system with an unvarying source of electrical energy. Upon the deflection part reaching its position of maximum deflection it effects a release of the open shutter blades, and accordingly the time required for the deflection part to travel from its starting to its fully deflected positions becomes a factor in how long the shutter blades are held open.

As shown in Fig. 1, a locking lever 17 is provided for holding the shutter blades in their open positions. The locking lever 17 is pivotally mounted on a spindle 18, and is biased in a clockwise direction by a spring 19 which tends to keep the uppermost arm of the lever in engagement with a fixed stop pin as seen in Fig. 1. The lever 17 carries a latch member 20 which is spring biased clockwise by a suitable spring as shown, said latch member being carried by the other or lower arm of the lever. The latch 20 cooperates with a pin 21 fixed on the shutter blade ring 3 to move therewith. The lever 17 may be swung counterclockwise by an electromagnet 22, and when the lever is not influenced by the magnet the latch 20 will be disposed in the path of movement of the pin 21, and will permit the pin to by-pass it during clockwise movement of the ring, but will prevent reverse passage of the pin 21 when the ring begins its counterclockwise or reverse movement, starting to close the shutter blades.

The locking lever 17 may carry an armature piece or may constitute an armature for the electromagnet 22, so as to be actuated thereby. A contact switch 23, 24 is provided in the circuit of the electromagnet 22, the said switch being arranged to close the circuit when the movable part or pointer 29 of the electro-responsive device (which may be an electromagnetic instrument movement such as a galvanometer) attains a position of maximum deflection. The electro-responsive device or galvanometer 25 is shown as having a moving coil 27 disposed in the magnetic field of a permanent magnet 26 and carrying the said pointer 29, the latter being cooperable with a speed scale 28 which is fixedly mounted to provide readings or indications of the position of the deflection part or pointer 29, these being an indication of the intensity of light of the field. The device or galvanometer 25 an dthe electromagnets 22 are both arranged for energization from a single source of current or battery 30, which for this purpose is connected with the two systems by means of leads 31, 32 and 33, 34 as shown. The galvanometer 25 is sometimes referred to herein as a first electromagnetic system, and the electromagnet 22 is sometimes referred to as a second magnetic system. Details of a control employing first and second electromagnetic systems of this type, similar in many respects to that disclosed herein, are illustrated in the copending application of the same assignee, Serial No. 792,379 filed February 10, 1959, and entitled Means and Method for Automatically Regulating Exposure Time in a Camera.

In order to establish a fixed relationship between the releasing of the shutter mechanism and the energization of the galvanometer 25 by the battery 30, there is provided in the circuit of the galvanometer a contact switch comprising the parts 36 and 37, disposed within the shutter casing 1. The contact switch 36, 37 is actuated by a pin 38 carried by the shutter blade ring 3, the arrangement being such that the switch is in open position when the shutter is in a condition of rest with the shutter blades closed, and that the switch closes shortly after the shutter drive mechanism is made operative.

Also, in the circuit 31, 32 of the galvanometer 25 there is provided a manually operable checking switch 39, and such switch is operated simultaneously with another contact switch 42 which is disposed in the circuit 40, 41 of the photoelectric element 16. The switches 39 and 42 are alternately opened and closed; that is, when the switch 39 is closed the switch 42 is opened and vice versa.

For the purpose of taking into consideration the diaphragm opening of the camera with regard to the regulation of speed, a diaphragm 43 is disposed in front of the photoelectric element 16, the said diaphragm having an actuating ring 44 which is coupled by means of gearing as shown with an actuating ring 45 for the diaphragm 46 of the lens shutter.

The manner of operation of the device as above described is as follows.

The existing light conditions will activate the photoelectric element 16, and this element will energize the moving coil 27 of the galvanometer 25, thereby to position the said coil and the pointer 29 thereof in a given starting position which is indicative of the intensity of the light strking the photocell or element 16. Such starting position of the pointer 29 may be at various places on the scale 28. When the release lever 13 of the camera is actuated, the shutter blade ring 3 is driven clockwise, and at the beginning of such turning movement the switch 36, 37 is closed, connecting the battery 30 to the moving coil 27 of the galvanometer 25.

Under the action of the current provided by the battery 30, the moving coil 27 and the pointer 29 will now deflect from whatever starting positions they were held in by the energization of the photoelectric element 16, and since the energization of the battery 30 is relatively strong it will supply sufficient current to cause a full scale deflection of the coil 27 and pointer 29, that is, a deflection toward the contacts 23, 24. Such full scale deflection is indicated in Fig. 1 by the broken outlines adjacent the switch 23, 24.

Upon continued clockwise turning movement of the shutter blade ring 3, the pin 21 thereof will bypass the latching member 20 and as the shutter blade ring 3 tends to reverse, the pin 21 will be held against retrograde movement by the latch member, thereby holding the shutter blades 2 in their open positions. Release of the arrested shutter blade ring 3, to enable the shutter blades 2 to again close, is effected by energization of the electromagnet 22 which occurs in response to the pointer 29 arriving at its position of greatest deflection wherein it closes the contact switch 23, 24. The closing of the switch 23, 24 energizes the electromagnet 22 and causes the locking lever assembly 17, 20 to be swung counterclockwise, disengaging the latch 20 from the pin 21. Since the shutter blade ring 3 is now freed, it will be driven counterclockwise by the driving disk 4 and link 6, and just prior to termination of its counterclockwise movement, with the shutter blades 2 in their closed positions, the pin 38 of the ring will open the contact switch 36, 37. This de-energizes the moving coil 27, disconnecting it from the battery 30 whereupon the coil returns to a starting position as determined by the energization supplied by the photoelectric element 16 as the latter responds to the conditions of illumination. At the same time, the opening of the switch 36, 37 de-energizes the magnet 22, whereupon the lever 17, 20 is permitted to return in a clockwise direction, under the action of the spring 19.

In accordance with the present invention, the above described speed regulating device is arranged to be disconnected from the photoelectric element 16, and in place of the latter there is to be substituted a source of electric energy which is independent of the illumination field, this being accomplished by the provision of a selector switch means adapted to be manually actuated. The source of energy which is to be substituted for the photoelectric element 16 is shown in Fig. 1 as being constituted by the battery 48. The selector or alternative switch is indicated at 47, said switch comprising a movable part or arm 47a and two fixed contacts 47b and 47c which are alternatively engageable with the arm 47a. When the switch arm 47a is engaged with the contact 47b the photoelectric element 16 is connected with the speed regulating mechanism and controls the latter, whereas when the switch arm 47a is connected with the stationary contact 47c the photoelectric element 16 is disconnected or open circuited, and the battery 48 is connected with the speed regulating mechanism to effect a control thereof. Thus, for the switch position where the arm 47a engages the contact 47b, the automatic speed regulation as explained above is put into effect.

However, when the switch arm 47a engages the contact 47c the same speed regulating mechanism is utilized, but in conjunction with the battery 48, and the control of the speed becomes a function of the particular starting position of the pointer 29 and moving coil 27 as now effected by the battery 48, prior to the full scale deflection of the galvanometer 25 being effected by the battery 30.

In order to be able to set the device for different speeds utilizing the battery 48 as a control means to establish the starting positions of the pointer 29, there is provided a control in the form of a variable resistor 49 which is connected across the battery circuit and therefore across the circuit of the galvanometer 25. The variable resistor 49 may comprise a resistance coil or winding 49a, and a brush 49b arranged to traverse the resistance winding. The brush 49b may be shifted by means of a manually operable knob 50 (Fig. 1). With this organization, different positions of the brush 49b will effect different values of shunt resistance across the circuit of the galvanometer 25 and battery 48. Therefore, by appropriate adjustment of the knob 50, the pointer 29 may be placed in different starting positions. Moreover, the speed which will be obtained by the starting positions of the pointer 29 may now be read from the scale 28, and the said scale also provides readings of the shutter speed which are obtained when the control utilizes the photoelectric control element 16 to effect an automatic adjustment.

In place of the continuous resistance winding 49a a number of different sized fixed resistors may be employed, for connection in parallel in the circuit, and the brush 49b may be in the form of a selector switch having a plurality of positions corresponding to the number of fixed resistors utilized. The operation of the speed regulating mechanism, when utilizing the battery 48 and resistor 49 by virtue of the switch 47a being connected to the contact 47c requires no further explanation beyond that given above in connection with the control by the photoelectric element 16, since it may be readily understood that the different adjusted positions of the knob 50 will result in different starting positions of the pointer 29 and coil 27, in a manner similar to the different intensities of light in the field of illumination effecting different starting positions of the pointer and coil. In the case of the control employing the battery 48 and resistor 49, the different starting positions may be manually effected, whereas when the photoelectric element 16 is utilized the starting positions are automatically effected in keeping with the strength of the field of illumination.

From the foregoing description in conjunction with the drawings it may now be understood that different preselected shutter speeds may be obtained in a simple manner, utilizing the same speed regulating mechanism that is employed in obtaining automatic speed regulation by means of the photoelectric element 16, said pre-selected speeds involving a manual selection by means of the setting knob 50. In order to change from automatic control to manual control and vice versa it is only necessary to actuate the selector switch 47. It may also be readily understood that for the purpose of obtaining a manual adjustment of the shutter speed, which is extremely important in connection with the making of flash exposures, there is only required in addition to the speed regulating mechanism coupled to the photoelectric element 16 a simple battery circuit and battery 48 together with the simple variable resistor 49 for effecting the manual adjustment, also, the battery 48 and the resistor 49 may be readily located in any suitable available space in or on the picture taking apparatus.

Referring to the schematic circuit diagram of Fig. 3, there is disclosed a modification of the invention, involving a different type of speed regulating mechanism. As shown in this figure, there is provided a galvanometer 125 which is connected to be energized by the photoelectric element 16. The moving coil of the galvanometer 125 carries a thin segment-like member 129 which is adapted to cover one or more different openings 100, 101, 102 and 103 in a successive manner. As is well understood in the art, the covering of such different openings may serve to control a well-known air-retarding mechanism which retards more or less the actuating movement of the shutter driving member. The number of the openings which will be covered is determined by the strength of the illumination field and/or the surface of the photoelectric element 16 which is exposed to the illumination.

A manner similar to that already described above in connection with the embodiment of the invention illustrated in Figs. 1 and 2, the action of the selector or alternative switch 47 having the switch arm 47a and fixed contacts 47b and 47c engageable by the switch arm 47a is such as to enable automatic or manual adjustment of the shutter speed. When the switch arm 47a is engaged with the contact 47b an automatic adjustment of the shutter speed is obtained under the control of the photoelectric element 16, in a manner similar to that already described above.

Also, as shown in Fig. 3, a battery 48 is provided, together with an adjustable resistor 49 having a resistance element 49a and a slider or contact arm 49b. When the switch arm 47a is engaged with the fixed contact 47c as illustrated in the figure, the resistor 49 is placed in parallel with the galvanometer 125. Simultaneously with actuation of the switch 47 in effecting such connection a switch 247 is actuated to close the circuit through the battery 48 whereby the latter applies energy to the resistor 49 and galvanometer 125. When the switch arm 47a is engaged with the fixed contact 47b, the switch 247 is actuated to open the circuit of the battery 48. Referring back to Fig. 1, a similar switch 247 is shown in series with the battery 48, said switch being opened when the switch arm 47a engages the contact 47b, and being closed when the switch arm 47 engages the fixed contact 47c, in a manner similar to that of the circuit shown in Fig. 3.

The brush or slider 49b shown in Fig. 3 has an index or setting mark 49c, arranged to cooperate with a speed scale 128 and the said scale and the respective settings of the variable resistor 49 are coordinated with the number of the openings 100, 101 etc., which are covered and which determine the retarding action of the air-retarded speed regulating mechanism.

The operation of the device as illustrated in Fig. 3, may now be readily understood from a consideration of the drawing and the above specification, and requires no further details, it being seen that automatic adjustment of the shutter speed is effected by the photoelectric element 16 energizing the galvanometer 125 when the selector switch 47 is actuated to connect the switch arm 47a with the contact 47b, whereas a manual adjustment of the shutter speed may be obtained when the switch arm 47a is engaged with the switch contact 47c, through manual adjustment of the slider or brush 47b. In each instance, the scale 128 will indicate the speed which is to be obtained for the exposure.

The embodiments of the invention illustrated and described above serve to explain the present invention by way of example. The invention has utility, however, in conjunction with automatic speed regulators of all types wherein the automatic regulation is effected in response to control of energy by means of a photoelectric receiver responding to conditions of illumination. With all such automatic speed regulators there is available a speed regulation which may serve not only in conjunction with the photoelectric element for effecting automatic speed, but also in conjunction with a manually operable device, such as the battery 48 and variable resistor 49 to enable a preselection of speeds to be obtained, as for the purpose of setting the camera properly for flash exposures.

In automatic speed regulators of the above type there is included, for example, a device wherein the speed of the exposure is a function of the running or actuating time of an impulse which may exist in the output of a magnetic amplifier. The size of such impulse, whether of voltage or current, may be determined by a greater or less continuous-current magnetization of the magnetic amplifier.

Such continuous current magnetization is effected in response to the illumination of a photoelectric element or receiver, which is connected to a control winding contained in the magnetic amplifier.

Substitutable for the pre-magnetization effected by the photoelectric element, in the magnetic amplifier above mentioned, would be the magnetization effected by the current or voltage source 48 and the adjustable regulator 49, as explained in connection with the illustrated embodiments of the invention.

The photoelectric element or photo receiver employed in the automatic regulation of the exposure or speed may be of the type which employs a separate source of voltage or current. Such photoelectric elements or receivers are for example known as photo-cells, photo-resistors and photo-transistors.

Where such photoelectric elements requiring an additional voltage or current source are utilized in the automatic speed regulating device, the present invention has special utility and may be employed with a minimum of additional parts and expense, by virtue of the fact that the same source of energy which is utilized as being independent of the illumination for effecting a manually adjustable control, may also constitute the additional voltage or current source which is required by the photoelectric element, in both cases the independent and additional voltage source being switched on by means of the selector or alternative switch, as by the provision of extra contacts and a suitable circuit arrangement such as is shown in Fig. 4, where the photoelectric receiver is a photo-resistor 16'.

As seen in this figure, when the coupled switch arms 47a and 47a' of switches 47 and 47' are engaged with the stationary contacts 47b and 47b' to effect the automatic regulation of speed, the battery 48 will be included in the circuit of the photo resistor 16' to supply the needed additional potential, by virtue of the circuit and switch connections shown.

I claim:

1. In a camera, in combination, means including a photoelectric element and an electro-responsive device adapted to be controlled by said element and to be conditioned thereby, for automatically controlling the speed of exposure in accordance with the intensity of the illumination field, the said exposure speed being a function of the conditioning of said device; a source of electrical energy independent of the illumination field; and manually operable switch means for alternatively connecting said electro-responsive device for control either by said element or by said source of energy whereby there may be had either automatic speed regulation in accordance with light conditions or else a settable speed regulation independent of light conditions.

2. The invention as defined in claim 1 in which there is a manually adjustable means for varying the energy supplied to the said device by the energy source, and in which there is a speed scale associated with said adjustable means to indicate the adjusted positions thereof.

3. The invention as defined in claim 1 in which the said source of energy is utilized for actuation of the said photoelectric element.

References Cited in the file of this patent
UNITED STATES PATENTS

| | | |
|---|---|---|
| 1,813,635 | Myers | July 7, 1931 |
| 2,059,032 | Riszdorfer | Oct. 27, 1936 |
| 2,179,717 | Fedotoff | Nov. 14, 1939 |
| 2,780,971 | Fahlenberg | Feb. 12, 1957 |
| 2,887,025 | Rentschler | May 19, 1959 |